United States Patent [19]

Hardgrove

[11] Patent Number: 4,817,307
[45] Date of Patent: Apr. 4, 1989

[54] BUMPER MOUNTING ASSEMBLY FOR A SNOWPLOW

[76] Inventor: David L. Hardgrove, 8433 Cleveland Ave., North Canton, Ohio 44720

[21] Appl. No.: 210,365

[22] Filed: Jun. 23, 1988

[51] Int. Cl.$^4$ .............................................. E01H 5/00
[52] U.S. Cl. ....................................... 37/197; 37/195; 37/231; 29/401.1
[58] Field of Search ................ 37/231, 279, 197, 195; 293/102, 120, 149, 151, 155; 29/400 M, 412

[56] References Cited

U.S. PATENT DOCUMENTS

| | | |
|---|---|---|
| 1,481,966 | 1/1924 | Lyon . |
| 1,482,226 | 1/1924 | Fageol . |
| 2,954,256 | 9/1960 | Barenyi . |
| 3,410,008 | 11/1968 | Standfuss . |
| 3,987,562 | 10/1976 | Deen et al. ............................. 37/231 |
| 4,236,329 | 12/1980 | Hetrick . |
| 4,304,056 | 12/1981 | Watson et al. . |
| 4,439,939 | 4/1984 | Blau ..................................... 37/231 |

Primary Examiner—Eugene H. Eickholt
Attorney, Agent, or Firm—Michael Sand Co.

[57] ABSTRACT

A bumper mounting assembly for a vehicle of the type having a frame, a snowplow blade mounting device mounted on the frame, and a bumper comprising a pair of outer sections and a center section. The bumper sections each have a similar contour, and the outer sections each have an inboard and an outboard end and the center section has a pair of outboard ends. The bumper mounting assembly comprises a pair of mounting brackets which generally are mirror images of each other. Each bracket is an integral one-piece member and includes a plate and first and second bars which extend outwardly in opposite directions from and are generally offset from each other by the plate. Each bar has a contour generally similar to the contour of the bumper sections, and the second bar and the plate define a recess in the mounting bracket. Upon mounting of the center bumper section on the snowplow blade mounting device, mounting of each bracket on the inboard end of a respective one of the outer bumper sections, and mounting of the outboard end of each outer bumper section on the vehicle frame, each of the pair of outboard ends of the center bumper section nests within the recess of a respective one of the mounting brackets, wherein the mounting brackets support the inboard ends of the outer bumper sections and maintain the outer bumper sections generally in abutment with the vehicle frame.

7 Claims, 2 Drawing Sheets

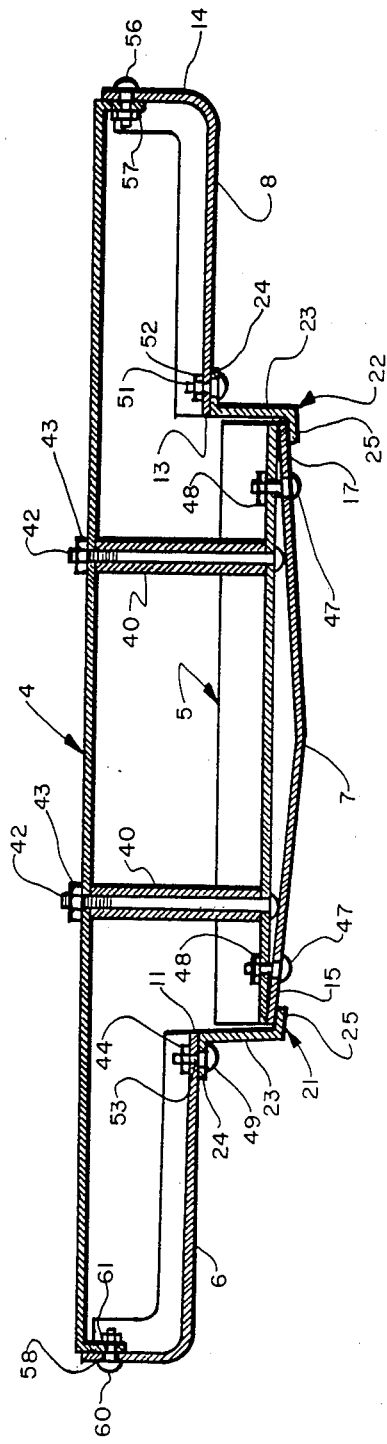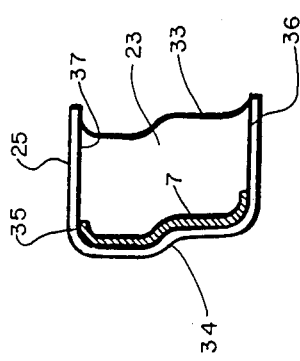

BUMPER MOUNTING ASSEMBLY FOR A SNOWPLOW

TECHNICAL FIELD

The invention relates to bumper mounting assemblies and in particular to a bumper mounting assembly for a vehicle of the type modified with snowplow equipment. More particularly, the invention relates to such a bumper mounting assembly which provides for securely mounting the outer bumper portions of a vehicle modified with snowplow equipment, substantially in abutment with the frame of the vehicle.

BACKGROUND ART

In areas which receive significant amounts of snowfall, many owners of light trucks or pickup trucks, jeeps, etc., mount snowplow equipment on the front of their vehicles. In order to mount the snowplow equipment on a vehicle, and in particular the blade used for clearing away snow, a blade mounting device must be mounted on the frame of the vehicle adjacent to its front end. However, in order to properly install the mounting device on the frame, the front bumper of the vehicle must be removed. After installation of the mounting device, the front bumper is replaced and the blade then is mounted on the device.

Most vehicle bumpers are one-piece members and are replaced as such after installation of a blade mounting device on a vehicle. However, the outer portions of such remounted bumpers are spaced approximately six inches from the vehicle frame since the center portion of the bumper is prevented from being placed in abutment with the frame by the blade mounting device. Therefore, spacers must be placed between the outer bumper portions and the frame to securely mount the bumper on the vehicle. This manner of remounting a bumper after installation of a blade mounting device on a vehicle detracts from the aesthetic appearance of the vehicle due to the large spacing between the outer portions of the bumper and the vehicle body. Moreover, the vehicle length is increased thereby reducing the turning clearance for the vehicle which can prevent the use of certain parking spaces, etc.

Thus, the present practice of many vehicle owners is to remove the mounting device and blade at the end of each winter which, while solving the above-described problems, necessitates complete reinstallation of this equipment the following year, which is time-consuming and costly. However, such an inconvenience presently is more desirable to many vehicle owners from both an appearance and a practical standpoint than leaving the blade mounting device on the vehicle with the bumper sticking out so far.

The closest known prior art to the present invention is disclosed in U.S. Pat. Nos. 1,481,966; 1,482,226 and 2,954,256. These patents show various means for fastening a pair of outer bumper sections to a center bumper section. However, my bumper mounting assembly, which provides for fastening a pair of outer bumper sections to a center bumper section in an offset relationship so that the outer bumper sections abut the vehicle frame when a snowplow blade mounting device is mounted on the frame, is not shown. The known prior art also includes U.S. Pat. Nos. 3,410,008; 4,236,329 and 4,304,056. These patents merely disclose means for mounting snowplow equipment on a vehicle, and are of general interest to the bumper mounting assembly of the present invention.

Therefore, the need exists for a bumper mounting assembly which securely mounts the outer portions of a bumper substantially in abutment with a vehicle frame when a snowplow blade mounting device is mounted on the frame.

DISCLOSURE OF THE INVENTION

Objectives of the invention include providing a bumper mounting assembly for a vehicle of the type modified with snowplow equipment, which provides for securely mounting the outer bumper sections of the vehicle substantially in abutment with the vehicle frame.

Another objective of the invention is to provide such a bumper mounting assembly which eliminates the need for removal and reinstallation of snowplow equipment, and especially the blade mounting device, at the conclusion and beginning of each winter season, respectively.

A further objective of the invention is to provide such a bumper mounting assembly which is economical to manufacture, which can be quickly and easily installed, which is durable in use and easy to maintain, which is aesthetically pleasing, and which has a simple yet effective design making it adaptable for use on many types and styles of vehicles.

These objectives and advantages are obtained by the bumper mounting assembly of the invention, for a vehicle of the type having a frame, a snowplow blade mounting device mounted on the frame, and a bumper comprising a pair of outer sections and a center section each having a similar contour, the outer sections each having an inboard and an outboard end and the center section having a pair of outboard ends, the general nature of which may be stated as including a pair of mounting brackets, the brackets each being a one-piece member including a plate and first and second bars, the bars each having a contour generally similar to the contour of the bumper sections, the bars further extending outwardly in opposite directions from and being generally offset from each other by the plate, the second bar and the plate of each of the brackets defining a recess in said bracket, so that upon mounting of the center bumper section on the snowplow blade mounting device, mounting each of the brackets on the inboard end of a respective one of the outer bumper sections, and mounting the outboard end of each of the outer bumper sections on the vehicle frame, each of the pair of outboard ends of the center bumper section nests within the recess of a respective one of the mounting brackets, enabling the mounting brackets to support the inboard ends of the outer bumper sections for maintaining the outer bumper sections generally in abutment with the vehicle frame.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 2 is an enlarged, longitudinal sectional view of the components of FIG. 1 in assembled condition; and FIG. 3 is an enlarged, fragmentary sectional view taken on line 3—3, FIG. 1, particularly showing the manner in which the center bumper section nests within one of the mounting brackets of the assembly.

BEST MODE FOR CARRYING OUT THE INVENTION

Figure 1:
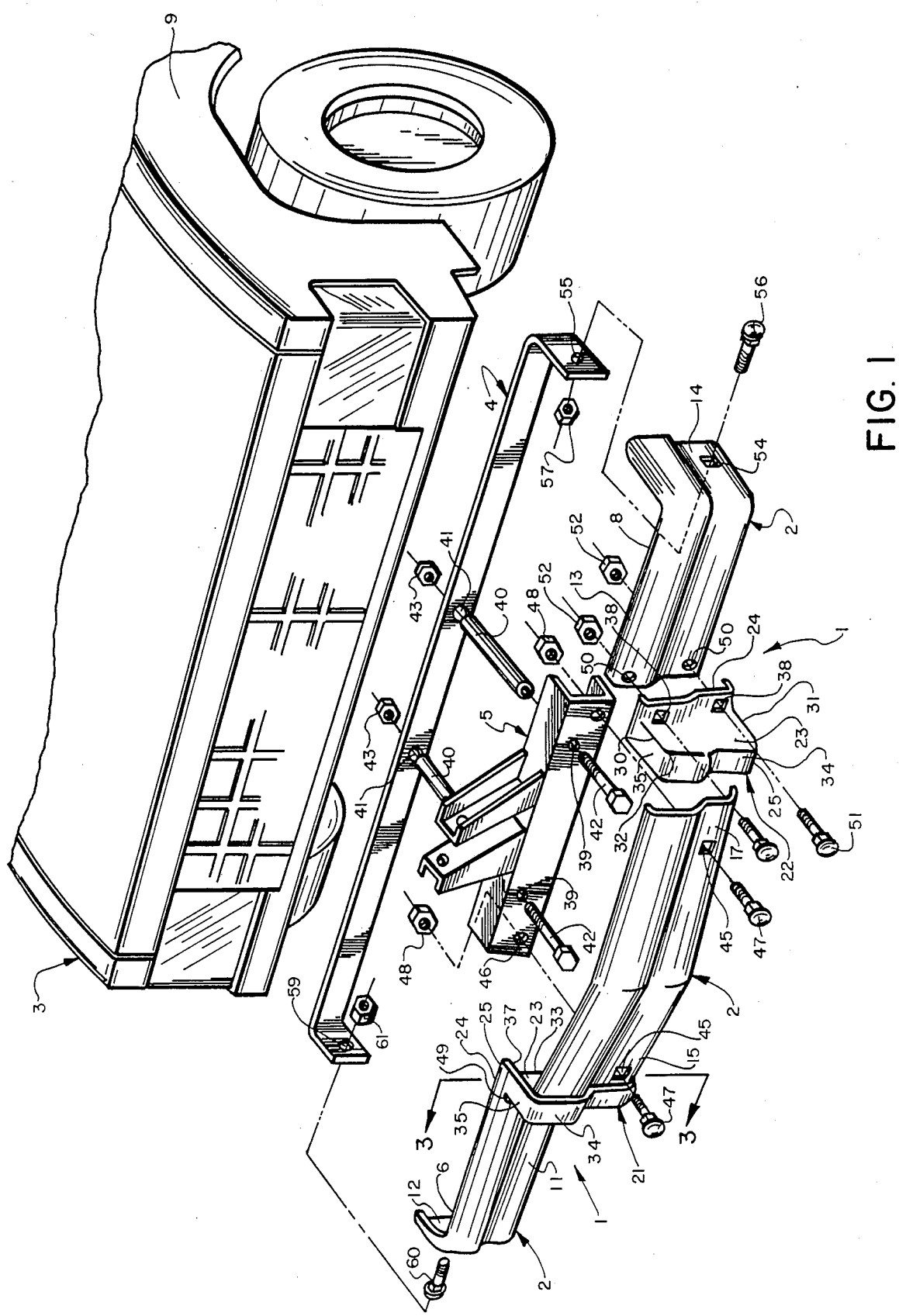
FIG. 1 is a partially exploded, fragmentary perspective view of the bumper mounting assembly of the invention, showing the manner in which the assembly assists in mounting a bumper on a vehicle having a snowplow blade mounting device mounted on its frame.

The bumper mounting assembly of the present invention is indicated generally at 1 and is shown in FIG. 1. Mounting assembly 1 is adapted for mounting a three-section bumper 2 on a vehicle 3 of the type having a frame 4 and a snowplow blade mounting device 5 mounted on the frame.

Bumper 2 (FIG. 1) comprises a pair of outer sections 6 and 8 and a center section 7, each of which have a similar contour. Outer bumper section 6 has an inboard end 11 and an outboard end 12, and outer bumper section 8 similarly has an inboard end 13 and an outboard end 14. Center bumper section 7 has a pair of outboard ends 15 and 17. Although mounting assembly 1 is intended for use with a bumper having three sections as described above, one-piece bumpers of the type presently installed on most vehicles can be used with mounting assembly 1 merely by cutting the one-piece bumper into three sections.

Mounting assembly 1 is intended for use in mounting such three-section bumpers on vehicles of the type typically modified with snowplow equipment, such as light trucks or pickup trucks, jeeps, etc. More particularly, mounting assembly 1 provides for securely mounting outer bumper sections 6 and 8 substantially in abutment with frame 4 and body 9 of vehicle 3 when snowplow blade mounting device 5 also is mounted on the vehicle frame, as best shown in FIG. 2.

The present practice of most owners of vehicles modified with snowplow equipment is to reinstall the bumper in one piece after installation of the blade mounting device on the vehicle frame. However, the outer portions of bumpers remounted in such a manner are necessarily spaced approximately six inches from the vehicle frame and body since the center portion of the bumper cannot be placed in abutment with the frame due to the presence of the blade mounting device thereon. This large spacing between the vehicle body and outer bumper portions adversely effects the aesthetic appearance or general "lines" or contour of the vehicle. Furthermore, such a large spacing adds to the length of the vehicle thereby reducing the turning clearance thereof which can prevent the use of certain parking spaces, etc. Thus, many vehicle owners find it desirable to remove the snowplow equipment at the end of each winter and reinstall the same the following winter to eliminate the above problems. However, such annual removal and reinstallation is time consuming and costly. The above-described problems are solved by the bumper mounting assembly of the present invention, which includes a pair of mounting brackets 21 and 22 which are similar in construction and use so that only one will be described in detail herein.

Each of the mounting brackets is an integral one-piece member preferably formed of three-sixteenths inch gauge aluminum or other similar material having the necessary strength and attractiveness for use in this application, such as chrome or a durable plastic (FIG. 1). The brackets are substantially mirror images of each other, with each of the brackets including a plate 23 and first and second bars 24 and 25. Plate 23 includes top, bottom, front, and rear edges 30, 31, 32, and 33, respectively. Front and rear edges 32 and 33 have a contour generally similar to the contour of bumper sections 6, 7 and 8. First bar 24 also has a contour generally similar to the contour of the bumper sections, and second bar 25 comprises a front portion 34 having a contour generally similar to the contour of the bumper sections, and a pair of spaced upper and lower portions 35 and 36 which extend rearwardly therefrom. Bars 24 and 25 extend outwardly of plate 23 in opposite directions and are offset from each other by the plate, with first bar 24 extending along rear edge 33 of plate 23 and second bar 25 extending along top, bottom and front edges 30, 31 and 32 of the plate. More specifically, front portion 34 of second bar 25 extends along front edge 32, and upper and lower portions 35 and 36 extend along top and bottom portions 30 and 31, respectively. Second bar 25 and plate 23 define a recess 37, and a pair of spaced openings 38 are formed in first bar 24, the purposes thereof being described in detail below.

Mounting assembly 1 is used to mount a three-section bumper 2 on a frame 4 of a vehicle 3 modified with a snowplow blade mounting device 5, in the following manner. Bumper 2 is removed from vehicle frame 4 so that blade mounting device 5 can be mounted on the frame. Mounting device 5 has a pair of spaced openings 39 formed therein, each of which is aligned with a respective one of a pair of spacers 40 and a respective one of a pair of spaced openings 41 formed in frame 4 (FIG. 1). Each of a pair of bolts 42 then is passed through respective aligned ones of openings 39 and 41 and spacers 40 and is secured by a nut 43 (FIG. 2).

If bumper 2 is a one-piece member, it then is cut into three sections including center section 7 and outer sections 6 and 8. Center bumper section 7 is mounted on blade mounting device 5 by aligning each of a pair of spaced openings 45 formed in center section 7 with a respective one of a pair of spaced openings 46 formed in mounting device 5 (FIG. 1). Each of a pair of bolts 42 then is passed through respective aligned ones of openings 45 and 46 and is secured by a nut 48 (FIG. 2).

Mounting bracket 22 then is mounted on inboard end 13 of outer bumper section 8 by aligning each of the pair of spaced openings 38 formed in first bar 24 with a respective one of a pair of spaced openings 50 formed in inboard end 13 (FIG. 1). Each of a pair of bolts 51 then is passed through respective aligned ones of openings 38 and 50 and is secured by a nut 52 (FIG. 2). Mounting bracket 21 similarly is mounted on inboard end 11 of outer bumper section 6 by aligning each of the pair of spaced openings 38 formed in first bar 24 with a respective one of a pair of spaced openings 53 formed in inboard end 11. Each of a pair of bolts 49 then is passed through respective aligned ones of openings 38 and 53 and is secured by a nut 44.

Outer bumper section 8 is mounted on vehicle frame 4 by aligning an opening 54 formed in outboard end 14 of outer section 8 with an opening 55 formed in frame 4 (FIG. 1). A bolt 56 then is passed through the aligned openings and secured by a nut 57 (FIG. 2). Outer bumper section 6 similarly is mounted on frame 4 by aligning an opening 58 formed in outboard end 12 of outer section 6 with an opening 59 formed in frame 4. A bolt 60 then is passed through the aligned openings and secured by a nut 61.

In accordance with one of the main features of the invention, as outer bumper sections 6 and 8 are being mounted on frame 4, outboard ends 15 and 17 of center bumper section 7 each nests within recess 37 of mounting brackets 21 and 22, respectively (FIGS. 2 and 3). This nesting serves to support inboard ends 11 and 13 of outer bumper sections 6 and 8 and prevents any upward, downward, frontward, or rearward movement of the outer bumper sections for maintaining the sections substantially in abutment with the vehicle frame and body. More specifically, the engagement of the upper and lower portions 35 and 36 of second bar 25 of mounting brackets 21 and 22 with the outboard ends 15 and 17, respectively, of the center bumper section prevents any upward and downward movement of the outer bumper sections. Moreover, engagement of front portions 34 with outboard ends 15 and 17 prevents any rearward movement of the outer bumper sections, and the abutment of outboard ends 15 and 17 with plates 23 prevents any frontward movement of the outer bumper sections. The offset relationship of bars 24 and 25 of the mounting brackets enables the outer bumper sections to be mounted substantially in abutment with the vehicle body and frame, even though the center bumper section is mounted outwardly therefrom due to the installation of the blade mounting device adjacent to the frame. In addition, the complementary contour of the first and second bars of the mounting brackets and the bumper sections provides for a close fit therebetween providing for a sturdier, more attractive assembly of parts.

Again, one-piece bumpers of the type presently in use on most vehicles can easily be adapted for use with bumper mounting assembly 1 merely by cutting the bumper at two locations, that is, between outboard end 17 of the center bumper section and inboard end 13 of outer bumper section 8, and between outboard end 15 of the center bumper section and inboard end 11 of outer bumper section 6. The only other necessary modification to an existing one-piece bumper is that pairs of spaced holes 50 and 53 must be formed in inboard ends 13 and 11, respectively, of the outer bumper section so that the mounting brackets can be mounted thereon. Holes 50 and 53 can be formed by any suitable means such as drilling.

In summary, it can be seen that the bumper mounting assembly of the invention provides for securely mounting the outer bumper sections of a vehicle modified with snowplow equipment, substantially in abutment with the vehicle frame. Use of the bumper mounting assembly thus eliminates the necessity of removing and reinstalling the snowplow equipment, and especially the blade mounting device thereof, at the conclusion and beginning of each winter season, respectively. Finally, the bumper mounting assembly is economical to manufacture, can be quickly and easily installed, is durable in use and easy to maintain, is aesthetically pleasing, and has a simple yet effective design making it adaptable for use on many types and styles of vehicles.

Accordingly, the bumper mounting assembly is simplified, provides an effective, safe, inexpensive, and efficient assembly which achieves all the enumerated objectives, provides for eliminating difficulties encountered with prior assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the bumper mounting assembly is constructed and used, the characteristics of the construction, and the advantageous, new and useful results obtained; the new and useful structures, devices, elements, arrangements, parts, and combinations, are set forth in the appended claims.

What is claimed is:

1. A method of mounting a bumper on a vehicle of the type having a frame and a snowplow blade mounting device mounted on said frame, by using a bumper mounting assembly comprising a pair of mounting brackets, each of which is a one-piece member having a plate and first and second bars, wherein the second bar and plate of each of the brackets form a recess in said bracket, said method including the steps of:
    (a) cutting the bumper into three sections, including a pair of outer sections and a center section, said outer sections each having an inboard end and an outboard end and said center section having a pair of outboard ends;
    (b) mounting the center bumper section on the snowplow blade mounting device;
    (c) mounting each of the brackets on the inboard end of a respective one of the outer bumper sections; and
    (d) mounting the outboard end of each of the outer bumper sections on the vehicle frame, so that each of the pair of outboard ends of the center bumper section nests within the recess of a respective one of the mounting brackets, enabling said mounting brackets to support the inboard ends of the outer bumper sections for maintaining said outer bumper sections generally in abutment with the vehicle frame.

2. The method defined in claim 1 including the steps of forming a pair of spaced openings in the inboard end of each of the outer bumper sections, aligning a pair of spaced openings formed in the first bar of each of the mounting brackets with the pair of spaced openings formed in a respective one of the outer bumper sections, and passing fastening means through said aligned openings for mounting each of the brackets on the inboard end of a respective one of the outer bumper sections.

3. A bumper mounting assembly for a vehicle of the type having a frame, a snowplow blade mounting device mounted on said frame, and a bumper comprising a pair of outer sections and a center section each having a similar contour, said outer sections each having an inboard end and an outboard end and said center section having a pair of outboard ends, wherein said bumper mounting assembly includes, a pair of mounting brackets, said brackets each being a one-piece member including a plate and first and second bars, said bars each having a contour generally similar to the contour of said bumper sections, said bars further extending outwardly in opposite directions from and being generally offset from each other by said plate, said second bar and the plate of each of the brackets defining a recess in said bracket, so that upon mounting of the center bumper section on the snowplow blade mounting device, mounting each of the brackets on the inboard end of a respective one of the outer bumper sections, and mounting the outboard end of each of the outer bumper sections on the vehicle frame, each of the pair of outboard ends of the center bumper section nests within the recess of a respective one of the mounting brackets, enabling said mounting brackets to support the inboard ends of the outer bumper sections for maintaining said outer bumper sections generally in abutment with the vehicle frame.

4. The device defined in claim 3 in which the mounting brackets generally are mirror images of each other.

5. The device defined in claim 3 in which a pair of spaced openings are formed in the first bar providing for passage of fastening means therethrough for mounting the brackets on the outer bumper sections.

6. The device defined in claim 3 in which the mounting bracket plate includes top, bottom, front, and rear edges; and in which the front and rear edges of said plate have a contour generally similar to the contour of the bumper sections.

7. The device defined in claim 6 in which the first bar extends along the rear edge of the mounting bracket plate; and in which the second bar extends along the top, bottom and front edges of said plate.

* * * * *